United States Patent [19]

Ayres et al.

[11] Patent Number: 4,782,206

[45] Date of Patent: Nov. 1, 1988

[54] METHOD AND APPARATUS FOR CONTROLLING WELD BEAD SHAPE TO ELIMINATE MICROFISSURE DEFECTS WHEN SHAPE MELTING AUSTENITIC MATERIALS

[75] Inventors: Paul S. Ayres, Forest, Va.; David P. Edmonds, N. Canton, Ohio; Dennis D. Hartwig, Massillon, Ohio; David E. Merker, Minerva, Ohio; Charles M. Weber, Alliance, Ohio

[73] Assignee: The Babcock & Wilcox Company, New Orleans, La.

[21] Appl. No.: 7,146

[22] Filed: Jan. 27, 1987

[51] Int. Cl.[4] .............................................. B23K 9/04
[52] U.S. Cl. ............................. 219/76.14; 219/76.12; 219/137 R
[58] Field of Search ............. 219/137 R, 137 WM, 74, 219/76.1, 76.12, 76.14

[56] References Cited

U.S. PATENT DOCUMENTS

| | | | |
|---|---|---|---|
| 2,813,190 | 11/1957 | Felmley | 219/76.14 |
| 3,019,327 | 1/1962 | Engel | 219/76.12 |
| 4,258,242 | 3/1981 | Fujimori et al. | 219/137 R X |
| 4,404,450 | 9/1983 | Weldon | 219/76.12 |
| 4,409,466 | 10/1983 | Commeau | 219/137 R |

FOREIGN PATENT DOCUMENTS

| | | | |
|---|---|---|---|
| 2526696 | 11/1983 | France | 219/74 |
| 0115371 | 6/1985 | Japan | 219/76.1 |
| 1463752 | 2/1977 | United Kingdom | 219/76.14 |

Primary Examiner—Clifford C. Shaw
Attorney, Agent, or Firm—Eric Marich; Vytas R. Matas; Robert J. Edwards

[57] ABSTRACT

A method and apparatus for eliminating microfissure defects in shape melted austenitic material components by closely controlling the deposited weld bead shape to a geometry where the underbead shape has no sharp discontinuities. Oscillation of the welding torch head during the process is used to smooth out the weldbead shape and is especially adapted for use with gas metal-arc welding processes.

10 Claims, 3 Drawing Sheets

METHOD AND APPARATUS FOR CONTROLLING WELD BEAD SHAPE TO ELIMINATE MICROFISSURE DEFECTS WHEN SHAPE MELTING AUSTENITIC MATERIALS

BACKGROUND OF THE INVENTION (1) Field of the Invention

The present invention relates in general to the shape melting welding process for constructing components, and, in particular, to a new and novel method and apparatus for eliminating microfissure defects in shape melted austenitic material components by closely controlling the deposited weld bead shape to a specific geometry.

(2) Description of the Related Art

As used herein, the term shape melting is used to refer to a welding process whereby structural components are manufactured entirely from weld material deposited layer-upon-layer onto a surface or an initial preform until the desired geometry is achieved. This process offers the advantage of delivering a near net shape component that can be produced quickly and economically using either ferrous or non-ferrous materials.

Automation and computer control can be made integral parts of a shape melting process, thus allowing for maximum flexibility of the shape melting production station. In the initial stages of a project, the design criteria for a particular component to be created by the shape melting process would be subjected to a computerized analysis. Assuming the flexibility to meet the design criteria existed within the shape melting production station, the desired welding parameters could then be programmed into the equipment and functions which control the process.

Since the shape melting process creates components made entirely out of deposited weld metal, the application of automated computer control to the process can result in a final product with "custom tailored" mechanical, corrosion and physical properties. This comes about because these properties are strongly tied to the interrelated functions of weld heat input, cooling rates, bead size and shape, bead sequence and bead position. If, in addition to the above variables, one also permits the composition of the weld filler material to vary in a controlled manner throughout the product, the component can have a desired combination of strength, toughness, hardness or corrosion resistance at critical points.

Special concerns exist, however, when austenitic materials are to be used to produce components by the shape melting process. As used herein, the term austenitic material is intended to refer to the weldable grades of austenitic stainless steels, nickel based superalloys, and iron-nickel based alloys that are particularly weldable by common arc-welding processes such as gas metal arc welding (GMAW), submerged arc welding (SAW), or plasma gas metal arc welding (P-GMAW). One example of such an austenitic material is Inconel 625, a trademark of the International Nickel Company.

The austenitic materials are valued for their unique combination of strength and corrosion resistance. However, when thick and/or highly restrained weld deposits are built up using austenitic materials, a condition known as microfissuring can be engendered. The occurrence of microfissuring is extremely important since it directly impacts the strength of the weld, or, in the case of a shape melted component made from austenitic materials, affects the soundness of the entire component. For the case of shape melting then, these austenitic materials are generally deemed "sensitive materials", since thick weld build-ups of complex shapes are being manufactured and high levels of restraint are anticipated. The fact that these materials are "sensitive", however, does not eliminate the need or desirability of shape melted components made from austenitic materials.

Various investigators have developed methods and apparatus related to the shape melting process. Brandi, deceased, et al (U.S. Pat. No. 3,985,995) discloses a method of making large, structural, one-piece shafts, such as those used in turbines and electric generators, made entirely from weld metal. Pre and post-cooling is used around the point of weld metal deposition to locally cool the workpiece below the martensitic temperature to obtain a bainite or ferrite/pearlite crystalline structure. The method is indicated as being applicable to low carbon steel, unalloyed steel, and low alloy steel (up to 5% Cr and/or 5% Ni).

Million, et al (U.S. Pat. No. 4,517,434) discloses a method and apparatus for manufacturing a tube bend, such as an elbow, by the shape melting process. A base weld ring of the required diameter of the bend is applied to a plate which is capable of downward rotation away from the welding heads, along the radius of curvature desired in the tube bend, and to the degree of the bend desired (30, 45, 90 degrees, etc) as successive layers of weld material are applied. Plural welding heads can be used to make the outer wall of the bend section of a ferritic material, while an inside plating of an austenitic material is being sequentially applied.

Ruckdeschel (Federal Republic of Germany Public Disclosure No. 24 45 891—Public Disclosure Date Apr. 8, 1976) discloses a process and device for applying a surface coating to a cylindrical object using strip or wire electrodes and a plurality of welding heads. The cylindrical object is continuously rotated during the process while the strip electrodes are helically melted thereon, and results in an increase in the speed of the process. The application of the weld beads leaves gaps that are filled in when the successive layers are applied. If wider surface-welded beads are to be created with wire electrodes, the individual wire heads can be moved in an oscillating manner. Other than the resulting wider beads, however, the particular relationship between such oscillation and the resulting overall bead shape, or the benefits of a particular bead shape to the properties of the component being produced, is not disclosed.

Million, et al (European Patent Office Publication No. 0,163,828 A1—Public Disclosure Date Dec. 11, 1985) discloses a process for manufacturing a structural component from weld material using multiple-layer surface welding. During the process, the structure of a weld bead layer is transformed once or several times during the application of subsequent layers in which the weld-bead shape, melting depth, penetration depth and depth of the underlying coarse-grained or fine-grained transformed structural zones are entirely transformed into a zone of fine-grained structure. The process is characterized by the fact that it is particularly well suited to producing weld material whose material qualities correspond to the 10MnMoNi 5 5 grade of steel. The 10MnMoNi 5 5 grade of steel is similar to ASTM A533 Gr. B, Cl. 1 or ASTM A508 Cl. 3, which are ferritic steels. To control the desired thermal transformation of the heat affected zone, a weld bead geometry corresponding to a flat weld bead with a more lens-shaped cross-section is used. It is to be noted that there are no particular teachings in EPO Publication No. 0,163,828 A1 as to how the particular weld bead geometry is to be attained. Further, the particular goal of transforming the heat affected zone of the underlying layers to obtain a fine-grained structure indicates that the disclosure is primarily directed to ferritic materials (that do not suffer from the above-described microfissuring problems), since such a grain structure is not achieved with the above-mentioned austenitic materials by such a thermal process.

It has thus become desirable to develop an improved method and apparatus for use in the production of shape melted components made from austenitic materials that can eliminate the potential for microfissuring type defects in the components themselves.

SUMMARY OF THE INVENTION

The present invention provides a new and novel method and apparatus for eliminating microfissure defects in shape melted austenitic material components by closely controlling the deposited weld bead shape to a specific geometry. By optimizing welding heat input, workpiece travel speed, wire feed speed, and by oscillating the welding head itself in a particular manner during deposition of the austenitic weld material, a desirable bead shape which has no sharp discontinuities in the underbead shape can be obtained. It has been determined that by eliminating any sharp discontinuities in the underbead shape, the microfissure defects that can occur in shape welded austenitic materials can be greatly reduced or even eliminated.

Accordingly, one aspect of the present invention is to provide a method for creating shape melted austenitic material components that are free of objectionable microfissure defects by closely controlling the welding process deposited weld bead shape.

Another aspect of the present invention is to provide an apparatus for producing shape melted austenitic material components by the welding process having means for closely controlling the deposited weld bead shape.

The various features of novelty which characterize the invention are pointed out with particularity in the claims annexed to and forming a part of this disclosure. For a better understanding of the present invention, and the operating advantages attained by its use, reference is made to the accompanying drawings and descriptive matter in which a preferred embodiment of the invention is illustrated.

DESCRIPTION OF THE PREFERRED EMBODIMENTS

Figure 1:
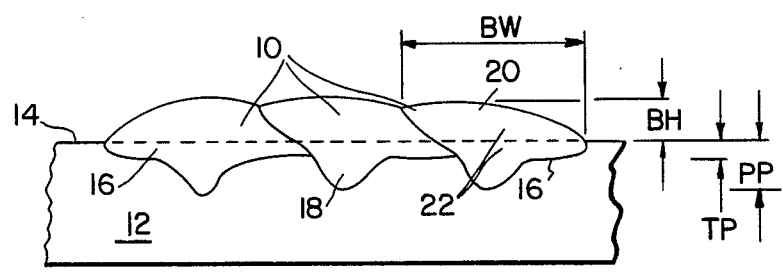
FIG. 1 is a drawing showing a cross-section of a single weld metal layer having three overlapping weld beads applied to a weld build-up pad.

A brief discussion of some background information and definitions relating to the present invention will be presented before commencing the detailed description.

The synergic gas metal-arc welding (synergic GMAW) process is capable of high deposition rates of weld bead material, can be readily adapted to robotic systems, and can be easily used for out of position fabrication where close control of the weld puddle is required. The term synergic is used to refer to a particular type of commercially available GMAW power supplies; two examples of these are the AIRCO Pulse Arc 350 or the HOBART Quantum 350. The power supply, in the case of the AIRCO Pulse Arc 350, consists of a power supply, wire feeder, gun and remote control pendant, and incorporates electronic feedback control to permit accurate setting of process parameters. These types of power supplies provide weld material droplet transfer that is more clean and stable than conventional pulsed GMAW power sources. Both types of power sources yield out-of-position welding capabilities with good wetting and moderate penetrating weld pools.

Experimental work with shape melting of Inconel 625 materials was performed using the synergic gas metal-arc welding (synergic GMAW) process at three weld metal deposition rates to study the effect of heat input and deposition rate on the mechanical properties. The tested rates were 6, 10, and 14 lb/hr. Serious microfissure or hot cracking problems were discovered in the 10 and 14 lb/hr weld build-up pads. Restraints varied from low to high and heat inputs ranged from 14.4 KJ/in to 40 KJ/in in the weld deposits that contained the fissuring. Restraint (i.e., the degree to which a backing bar on the weld build-up pad prevents distortion), heat input, and welding filler wire chemical composition were initially postulated as the cause(s) of the cracking. With respect to the weld filler wire, although it had been supplied in two different surface conditions, i.e., (1) gas cleaned and (2) lubricated, further study indicated no significant differences were detected between the two surface conditions.

A literature review concerning the susceptibility of Inconel alloys to the above-described microfissuring revealed that several factors have been identified. Hot cracking susceptibility is reported to increase with increasing concentrations of silicon, sulfur, niobium, boron, phosphorous, carbon, bismuth, zirconium, and lead while decreasing with increasing concentrations of manganese and magnesium. Increasing grain size, heat input and weld pool width/depth ratio are reported to also increase the susceptibility to the hot cracking. Conflicting results were found concerning the influences of restraint, preheat and interpass temperature (the temperature at the point of welding in a multipass weldment component).

Eight weld metal pads were prepared using the synergic GMAW process to evaluate the effects of different welding conditions. The results of these test specimens and the welding conditions associated therewith are found in TABLES 1, 2 and 3. The preliminary weld metal pads made to evaluate the wire surface conditions discussed above are presented as Specimen 8.

Figure 2:
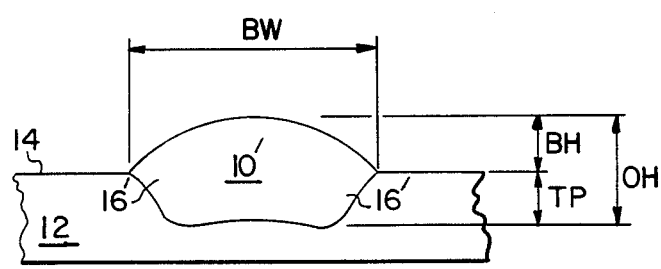
FIG. 2 is a drawing showing a cross-section of a single weld bead having an underbead shape without a sharp discontinuity or papilla.

Referring now to the figures generally, and to FIGS. 1 and 2 in particular, wherein like numerals designate the same element throughout the several drawings, FIG. 1 is a drawing of a typical cross-section of a single weld metal layer having three overlapping weld beads 10 having a bead width BW and a bead height BH that have been deposited on a weld build-up pad 12 having a top surface 14. The toe area 16 of the weld bead 10 penetrates the top surface 14 of the weld build-up pad 12 to a toe penetration depth TP. These are typical weld beads produced with a GMAW stringer bead technique (i.e., no oscillation of the welding head), and resulted in the underbead sharp discontinuity or papilla 18 which extends below the top surface 14 of the weld build-up pad 12 to a papilla penetration depth PP. The cross-sectional area of the weld bead 10 lying above the top surface 14 of the weld build-up pad 12 is termed the reinforcement area 20. The entire cross-sectional area of the weld bead 10 is termed the nugget area 22. FIG. 2 shows a cross-section of a single weld bead 10′ having an underbead shape without the sharp discontinuity or papilla 18, which is produced by the oscillation of the welding head (not shown) of the present invention during weld deposition and which resulted in the decreased susceptibility for microfissuring. In general, a ratio of BW to overall height OH on the order of 3:1 is preferred.

TABLE 3

Welding Variables for Specimens in TABLE 1

| Spec. # | Volts | Amperage | Travel Speed | Stickout From Tip | Shield Gas CFH | Preheat/ Interpass Temp. F. |
|---|---|---|---|---|---|---|
| 1 | 36–37 | 245–255 | 14 ipm | 1.125 in | 60 Ar 20 He | 200/400 |
| 2 | 32–33 | 175–185 | 12 ipm | 1.0 in | 60 Ar 20 He | 200/400 |
| 3–4 | 27–28 | 175–185 | 12 ipm | 1.0 in | 60 Ar | 100/300 |
| 5 | 27–28 | 170–180 | 14 ipm | 1.0 in | 60 Ar | 100/300 |
| 6–7 | 29–30 | 195–205 | 18 ipm | 1.0 in | 60 Ar | 100/300 |

AIRCO Pulse Arc 350 Power Supply
Bead Index = (0.6) Bead Width
Wire Type = 0.045 in I625
Welding Torch = Linde ST12
Linde Oscillator Conditions
Frequency = 80 cycles/min
Oscillation Width = 0.125″
No Dwell Turning to TABLES 1–3, the fissures in Specimens 1 and 2 occurred parallel to the papilla 18 in the heat affected zone. Specimen 3 assessed bead shape effects, the objective thereof being to alter the bead shape by oscillating the welding torch and changing the shielding gas. Welding conditions for Specimen 3 were identical

TABLE 1

| Specimen | Wire Heat | Restraint | Deposition Rate/HI | Oscillation | Degree of Fissuring | Comment | Results |
|---|---|---|---|---|---|---|---|
| 1 | NX07E2AK | High | 14 lb/hr - 40 KJ/in | No | Severe | Original cracked material. | NA |
| 2 | NX07E2AK | Medium | 10 lb/hr - 30 KB/in | No | High | Original cracked material. | NA |
| 3 | NX07E2AK | High | 10 lb/hr - 25 KJ/in | Yes | Low | Same as Specimen 2 but added oscillation. | Bead shape changed; significantly decreased fissuring. |
| 4 | #325 | High | 10 lb/hr - 25 KJ/in | Yes | None | Same as Specimen 3 but used different wire heat. | Bead shape + wire chemistry changed; eliminated fissuring. |
| 5 | NX07E2AK | High | 10 lb/hr - 20 KJ/in | No | Medium | Same as Specimen 2 but used faster travel speed (lower HI). | Reduced HI; slightly decreased fissuring. |
| 6 | NX07E7AK | Low | 14 lb/hr - 20 KJ/in | No | High | Same as Specimen 1 but used faster travel speed (low HI) and lower restraint. | Reduced HI + restraint; slightly decreased fissuring. |
| 7 | #325 | Low | 14 lb/hr - 20 KJ/in | No | Low | Same as Specimen 6 but used different wire heat. | Wire chemistry changed; significantly decreased fissuring. |
| 8 | NX07E2AK | Low | 10 lb/hr - 30 KJ/in | No | Medium | Same as Specimen 2 but used lower restraint. | Lower restraint; slightly decreased fissuring. |

TABLE 2

Chemical Analysis of I625 Filler Wire - % by wt.

| Element | Wire Heat #NX07E2AK | Wire Heat #325 |
|---|---|---|
| C | 0.02 | 0.025 |
| Mn | 0.07 | 0.16 |
| P | 0.007 | 0.010 |
| S | 0.002 | 0.001 |
| Si | 0.20 | 0.21 |
| Cr | 21.83 | 22.05 |
| Ni | 61.30 | Balance |
| Mo | 8.95 | 8.95 |
| Cu | — | 0.28 |
| Al | 0.27 | 0.22 |
| Co | — | 0.11 |
| Ti | 0.34 | 0.28 |
| Ta/Cb | 3.35 | 3.35 |
| Fe | 3.66 | 4.4 | to Specimens 1 and 2 except for a slightly lower voltage and a change from a shielding gas of argon-helium to pure argon. Some microfissures were still noted but the size and number of fissures was significantly decreased.

Specimen 4 used the conditions of Specimen 3 except that a different heat of filler wire was used, chosen particularly for its higher Mn/S ratio. Only small microporosity features (5 microns in diameter) were noted in this fissure free weldment.

Specimen 5 assessed the effect of lowering the heat input from 30 KJ/in to 20 KJ/in for comparison with Specimen 3. Since the number of fissures found in Specimen 5 was less than in Specimen 2, but more than for Specimen 3, it must be concluded that bead shape has a more significant effect than heat input in reducing cracking.

Specimen 6 assessed the effects of greater reductions in heat input, and was made with the same filler wire as Specimen 1 but with low restraint (base plate only, no backing bar) and utilized the stringer bead technique. By comparison with Specimen 1, lowering heat input and restraint had only a slight effect in decreasing fissure susceptibility. Increased travel speed with increased deposition rate (at constant heat input) has an effect on bead shape, manifested by increased papilla penetration. Again bead shape appears to be a primary factor in cracking susceptibility.

Specimen 7 was made with welding conditions identical to those of Specimen 6 except that the filler metal was changed back to that used for Specimen 4. A significant reduction in the microfissures was observed. Obviously, chemical composition has a first order effect on fissure formation, but the fact that the Heat #325 filler material cracked when deposited using Specimen 7 weld conditions, but not under Specimen 4 conditions indicates that bead shape also has a first order effect.

As a result of these investigations, it has been determined that bead shape has a first order effect on hot cracking susceptibility in austenitic materials, and that the sharp underbead transition (i.e., the papilla 18) should be avoided. Chemical composition also has a first order effect upon fissuring susceptibility. Heat input and deposition rate have a second order effect on fissuring susceptibility by influencing bead shape, as does restraint.

Figure 4:
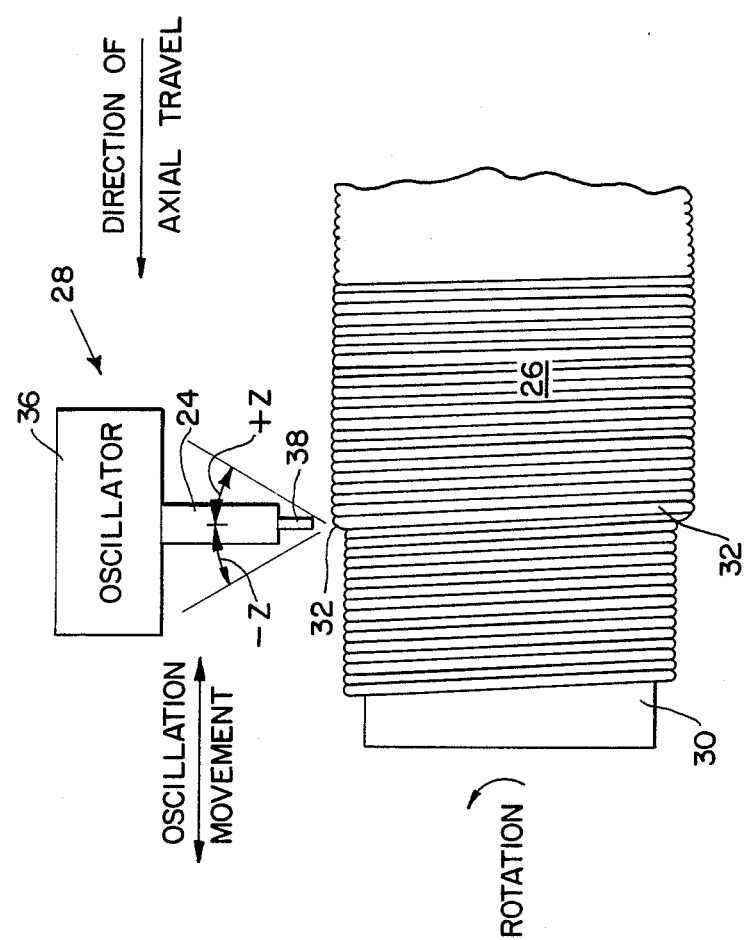
FIG. 4 is a right hand side view of the shape melting production station of FIG. 3 further illustrating various geometrical relationships.
Figure 3:
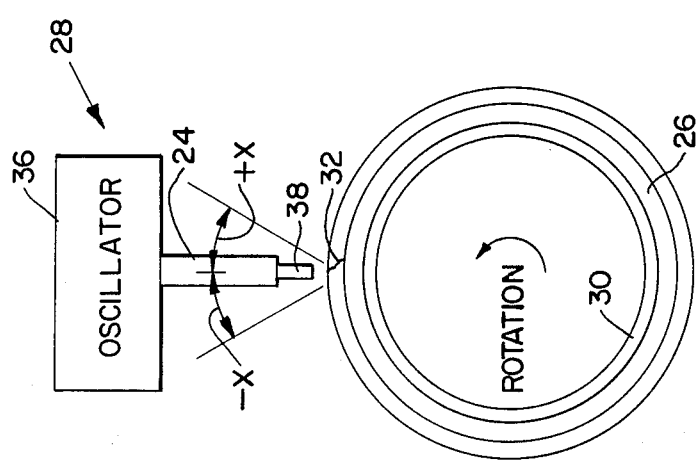
FIG. 3 is an end view of a welding head and workpiece of a shape melting production station illustrating various geometrical relationships.

Referring now to FIGS. 3 and 4, shown therein is an end and side view of a welding head or torch 24 and a cylindrical workpiece 26 located in a shape melting production station 28. The workpiece 26 is built up in layers upon a preform 30 that is rotated by drive means (not shown) and at a desired rotational speed. The torch angle X refers to the angle of the welding torch 24 with respect to the line of travel of a deposited weld bead 32. A torch angle X of 0 degrees would be vertical; a positive value of X would be in degrees from vertical in the forehand direction, i.e., with the arc angled away from the weld bead 32 being deposited. Conversely, a negative value of X would be in degrees from vertical in the backhand direction, i.e., with the arc angled towards the weld bead 32 being deposited. In general, increasing the torch angle in the +X (forehand) direction produces deposited weld beads 32 with shallower, more rounded penetration shapes; increasing the torch angle in the −X (backhand) direction produces beads 32 which are more rounded than those produced in the vertical position, however the penetration depth is nearly the same. With increasing −X, the weld beads 32 also become narrower and higher with a steep angle to the toe 16. Values for torch angle X should lie within ±30 degrees.

The welding head or torch 24 is attached to an oscillator 36 to permit side to side oscillation of the welding head 24 relative to the line of travel of the deposited weld beads 32. There are three components to oscillation: width, speed, and dwell times. All three components are dependent upon each other and to travel speed (the speed at which the welding head 24 applies the deposited weld beads 32 to the workpiece 26) to produce good welds. For a given travel speed, the optimum oscillation width will spread the penetration point shape of the weld beads 32 and decrease its depth. Excessive oscillation width will produce one distinct penetration point which stitches back and forth through the deposited weld beads 32 if the oscillation speed is too low or will produce excessive splatter if the oscillation speed is too fast. The optimum oscillation width is one which will produce a flat, well rounded penetration pattern for the deposited weld beads 32 and still not produce excessive spatter. The optimum oscillation speed is one which will produce a good penetration shape for a particular oscillation width without stitching or excessive spatter.

Dwell times have little effect on penetration patterns of the deposited weld beads 32 up to about 0.25 second per side. Dwell times greater than this produce two distinct penetration points in the cross-section of the deposited weld beads 32. Also, excessive dwell time can produce a stitching effect in the deposited weld beads 32 surface which can cause weld defects later when welded over by subsequent beads 32. For multiple layers of beads 32, a slightly longer dwell time on the overlapping side will help produce a flat, uniform penetration and improve tie-ins on the previous deposited weld bead 32.

Torch angle Z refers to the angle of the welding torch 24 in a plane 90 degrees to the line of travel of the deposited weld beads 32. This torch angle Z is used when adding subsequent weld beads 32 to a previous weld bead 32. The angle is measured from the vertical with +Z angles pointing the welding torch 24 into the toe 16 of the previous weld bead 32. By increasing the torch angle Z, there is a slight decrease in the sharpness of the penetration of the deposited weld beads 32. The greatest advantage to torch angle Z is improved tie-in to the previous weld bead 32. Excessive values of torch angle Z (30 degrees and greater) produce an erratic arc when overlapping previous weld beads 32, and could also create surface irregularities in the deposited weld beads 32 which can be the site of defects.

To apply a continuous weld bead 32 to the workpiece 26 requires indexing of the welding torch 24. Indexing is the distance the welding torch 24 moves prior to making subsequent weld beads 32. Controlling the indexing regulates the amount of overlap that occurs between adjacent weld beads 32. Too little indexing produces thick weld beads 32, very shallow penetrations into the base material (the preform 30 or the workpiece 26), and very steep toe 16 angles which can act as sites for later defects. In addition, oscillating the arc over this type of thick weld bead 32 having steep toe 16 angles produces an erratic arc with voltage and current fluctuations due to changing stick-out (distance from the tip of a welding electrode 38 to the workpiece 26) lengths. Excessive indexing will produce weld beads 32 with deep valleys between beads 32. The proper amount of index will produce welds 32 which tie-in to each other without producing steep toe 16 angles or valleys between beads 32.

The travel speed of the welding torch 24 apparently has little effect upon the penetration or weld bead 32 shape, but both seem to increase proportionately with a decrease in travel speed.

Figure 5:
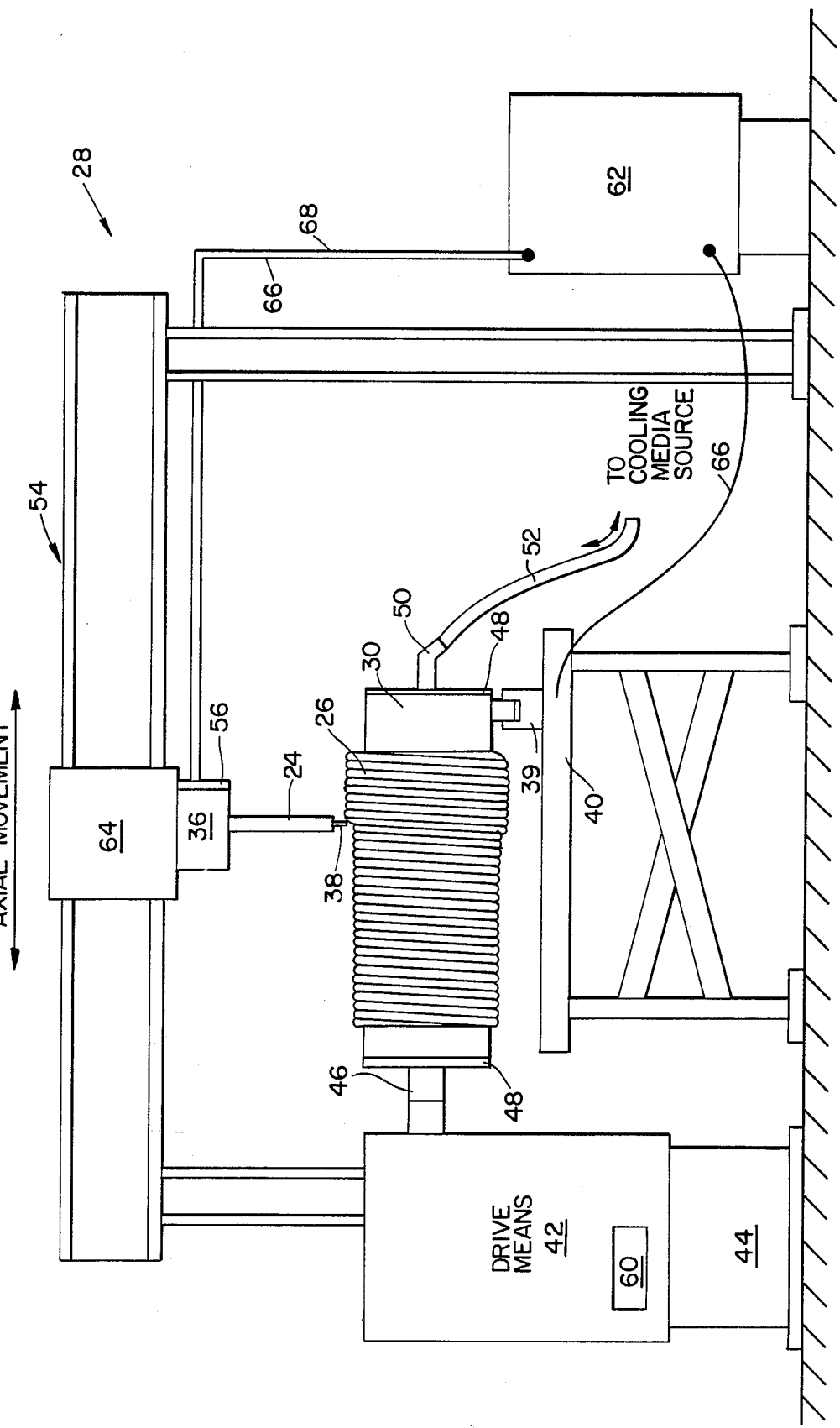
FIG. 5 is a schematic view of a shape melting station according to the present invention.

Referring now to FIG. 5, there is shown therein a schematic view of a shape melting station 28 according to the present invention particularly adapted to the production of rotationally symmetrical cylindrical workpieces 26. The workpiece 26 is developed layer upon layer on the preform 30, which is supported at one end by rollers 39 mounted on table 40. The other end of the preform 30 is attached to drive means 42, supported on stand 44, by means of a chuck 46 which serves both to support the end of the preform 30 and to rotate the preform 30 and the workpiece 26 at a desired rate during the shape welding process. The drive means 42 and the chuck 46 may advantageously comprise a three jaw chuck attached to an Aronson positioner. Both ends of the preform 30 are capped with plates 48 to seal off the ends of the preform 30. At the end of the preform 30 which is opposite the drive means 42, there is attached a rotary coupling 50 which is attached to cooling lines 52. The cooling lines 52 are attached to a source of cooling media, such as water, that circulates within the preform 30 during the shape welding process to maintain the preform 30 and its encircling workpiece 26 at a desired temperature, the cooling media being monitored by suitable temperature sensors (not shown).

The axis of rotation of the workpiece 26 is located horizontal to, parallel with, and below a side beam 54, such as a Jetline side beam, and to which the oscillator 36 and its attached welding torch 24 are translatably mounted and driven for motion along the length of the workpiece 26. Vertical adjustments of the height of the welding torch 24 with respect to the surface of the workpiece 26 are also provided to position the the welding electrode 38 at the required distance from the the workpiece 26. The welding torch 24 may advantageously comprise a Linde ST-12 model, while the oscillator 36 may be a Linde solid state oscillator. The mounting of the oscillator 36 and the attached welding torch 24 is also designed to permit angular motion of the welding torch 24 in the torch angle X and torch angle Z directions, and is also mounted on a manual cross-slide 56 to further facilitate adjustment of the welding torch 24 with respect to the workpiece 26. The oscillator 36, a drive means control 60, and a power supply and wire feeder 62 are all capable of independent adjustment and control to optimize the welding parameters for a given application. The power supply and wire feeder 62 is connected to the side beam's moving carriage 64 and to the welding torch 24 through electrical and mechanical connections 66 and 68, respectively.

The above described apparatus was used successfully to construct shape melted cylinders made from Inconel 625 austenitic material with excellent results. Some pertinent parameters used in the construction of these cylinders was as follows:

Filler Wire: 0.045" Inconel 625
Shield Gas: Argon Flow Rate: 70 CFH
Wire Feed Speed: 350–375 inches/minute
Average current/voltage: 175–205 Amps/27.5–30 volts
Oscillation Width, Frequency: 3/16" at 95 cycles/min
Indexing/revolution: 0.400 in
Interpass temperature: less than 400 F.

Non destructive examination of these cylinders did not reveal any rejectable indications. Density measurements, taken by weighing the cylinders in air and obtaining their water volume displacement, indicated the density to be 100% of theoretical. Metallographic analysis indicated that no oxides were present and only small amounts of microporosity (estimated at less than 0.01%). Finally, mechanical testing samples taken indicated mechanical properties superior to most conventional cast or forged Inconel 625 products.

While a specific embodiment of the present invention has been shown and described in detail to illustrate the application and principles of the invention, it will be understood that it is not intented that the present invention be limited thereto and that the invention may be embodied otherwise without departing from such principles. For example, while the preferred embodiments have been described in terms of the synergic GMAW process, the present invention is not limited thereto. Other conventional GMAW processes can utilize the present invention, including straight (non-pulsed) GMAW, pulsed GMAW, plasma-GMAW, and other closely related variations of the GMAW process. In addition, while aside beam was described as the apparatus for driving and translating the oscillator and its attached welding torch, any other suitable weld manipulator, including robotic devices, could be utilized in the practice of the present invention.

What is claimed is:

1. A welding method for eliminating microfissure defects in shape melted austenitic material components by closely controlling the deposition of weld metal throughout the shape melting process to avoid weld bead shapes having any underbead sharp discontinuities, comprising the steps of:
    providing an initial surface;
    providing a welding torch for depositing weld metal upon said initial surface in layers of successively applied weld beads at a specified interpass temperature;
    adjusting a torch angle Z of said welding torch in a plane 90 degrees with respect to a line of travel of the deposited weld beads to achieve improved tie-in between adjacent weld beads; and
    oscillating said welding torch in a side to side manner relative to the line of travel of said deposited weld beads during the shape melting process such that a penetration point of said weld beads is spread along the width of the bead to produce a flat, well rounded underbead shape lacking any sharp discontinuities.

2. The method as set forth in claim 1 further comprising the steps of rotating the initial surface and translating the welding torch along the initial surface during the shape melting process to produce a continuous weld metal layer and adjusting a torch angle X of said welding torch with respect to the line of travel of the deposited weld beads to produce weld beads having a more rounded penetration shape.

3. The method as set forth in claim 2 wherein the initial surface is a hollow cylindrical member.

4. The method as set forth in claim 3 wherein the deposited weld metal is Inconel 625.

5. The method as set forth in claim 2 wherein the torch angle X of the welding torch lies within + or −30 degrees of vertical.

6. The method as set forth in claim 5 further comprising the steps of controlling the oscillation width and speed of said welding torch to produce a flat, a well rounded penetration pattern for the deposited weld beads without stitching or excessive spatter.

7. The method as set forth in claim 1 further comprising the step of circulating a cooling media within the initial surface to maintain it and the deposited weld metal applied thereon at a desired temperature.

8. The method as set forth in claim 7 further comprising the step of indexing the welding torch to achieve tie-in between adjacent weld beads without producing steep toe angles or valleys between beads.

9. A welding apparatus for the manufacture of shape melted austenitic material components without microfissure defects, comprising:
    means for supporting a preform upon which austenitic weld material is to be deposited in layers of successively applied weld beads;
    means for rotating said preform during the deposition of the weld material;

a welding torch, having means for vertical adjustment with respect to the preform, for depositing said weld material onto said preform;

means for adjusting the angle of said welding torch with respect to a line of travel of said deposited weld beads (torch angle X);

means for adjusting the angle of said welding torch in a plane 90 degrees to the line of travel of said deposited weld beads (torch angle Z);

an oscillator, attached to said welding torch, for oscillating the welding torch in a side to side manner relative to the line of travel of said weld beads to produce a flat, well rounded underbead shape lacking any sharp discontinuities; and a side beam located in parallel spaced relationship to said preform, for driving and translating the oscillator and its attached welding torch and mounted thereon such that adjustments of the welding torch with respect to said preform in the vertical, torch angle X and torch angle Z directions can be made.

10. Apparatus as set forth in claim 9 further comprising means for circulating a cooling media within the preform to maintain the preform and the deposited weld material at a desired temperature.

* * * * *